May 13, 1952     M. F. PETERS     2,596,285
METHOD OF FORMING BEADED STRUCTURE
Filed Sept. 15, 1949
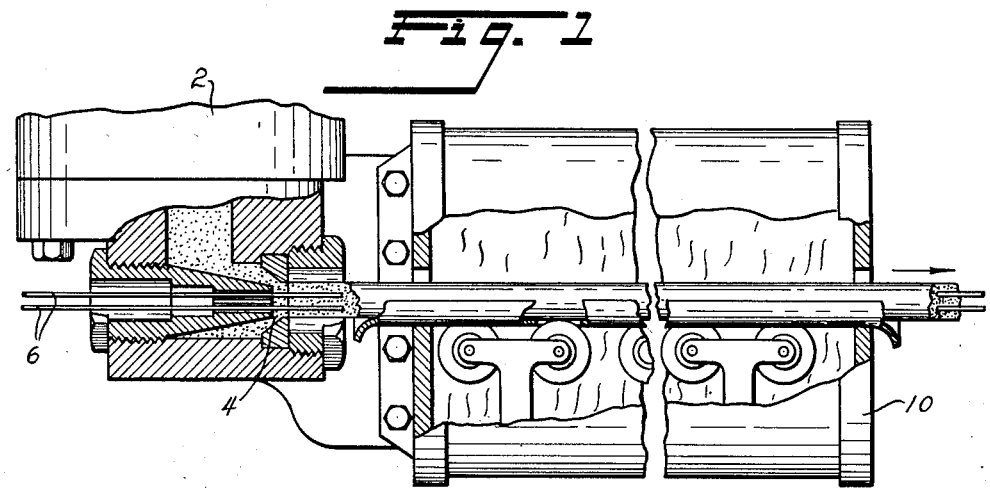
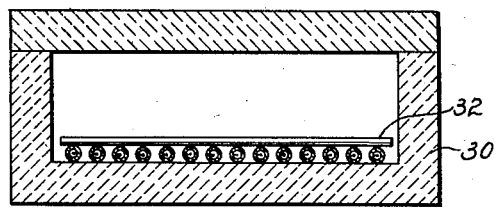
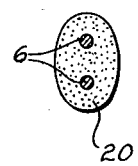
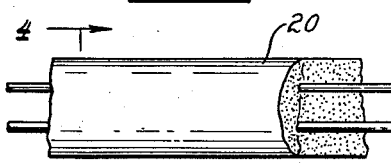
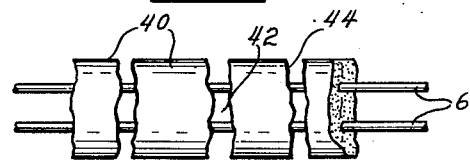
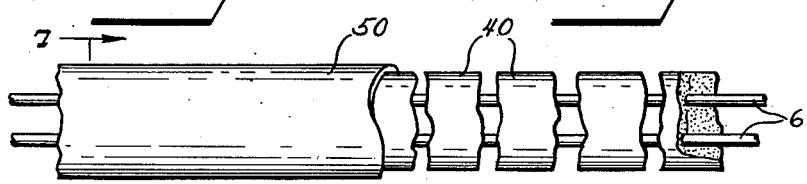
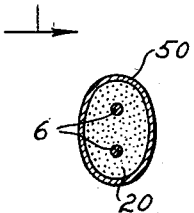
INVENTOR
MELVILLE F. PETERS
BY    Scrivener & Parker
ATTORNEYS Patented May 13, 1952

2,596,285

UNITED STATES PATENT OFFICE 2,596,285

METHOD OF FORMING BEADED STRUCTURE

Melville F. Peters, East Orange, N. J., assignor to Petcar Research Corporation, Newark, N. J., a corporation of New Jersey Application September 15, 1949, Serial No. 115,938

7 Claims. (Cl. 18—47.5)

This invention relates broadly to the manufacture of flexible cables of the general type comprising one or more continuous wires surrounded by a covering which may be electrically insulating or have other desired qualities.

In my co-pending application Serial No. 90,881, now Patent No. 2,586,252, I have disclosed and claimed a continuous wire cable of new and improved type and construction which is adapted and intended for use in fire detector systems. This cable comprises two spaced, continuous, electrically conductive wires which are surrounded and held in spaced, parallel relation by a dis-continuous covering consisting of what I call "beads" which are spaced along the conductors and are attached to them. The present invention is of great utility in the manufacture of such a cable but is of equal utility in the manufacture of other continuous beaded wire cables generally, regardless of the number of conductors or the use to which the cable is to be put. The primary result of the invention has been to provide a method of manufacturing beaded cables which is feasible and practical from the engineering, manufacturing and economic standpoints.

As stated above, the method provided by this invention is of great utility in the manufacture of fire detector elements of the continuous type particularly described and claimed in my co-pending application. When intended for use in such fire detection systems the beads which constitute the dis-continuous covering of the cable and which surround the two wires and hold them in spaced relation are formed of temperature-sensitive resistance material which has a relatively high resistance, and is therefore substantially an insulator, at normal temperatures and a relatively low resistance at some predetermined higher temperature. While this invention is of general utility in the manufacture of beaded wire cables of all types and regardless of the purpose for which the cable is to be used, it will be described in this application in connection with the manufacture of a cable having beads of thermistor material.

The method of manufacture provided by this invention consists, in general, in forming around one or more continuous, parallel wires, which may be electrically conductive, a solid cylinder of cohesive material which on heating becomes attached to the wire or wires and shrinks longitudinally thereof to form a dis-continuous covering consisting of beads spaced along the length of the wire or wires.

The steps in a preferred method according to the invention are illustrated in the drawings which, like the specification, are only illustrative of the invention and impose no limits thereon not imposed by the appended claims, and in which:

Fig. 1 illustrates the first steps of extruding material about spaced conductors and drying the extruded material;

Fig. 2 illustrates the next step of baking the extruded material;

Fig. 3 illustrates the detector element after drying but before baking;

Fig. 4 is a sectional view taken on line 4—4 of Fig. 3;

Fig. 5 illustrates the detector element after the baking step;

Fig. 6 illustrates the detector element of Fig. 5 after enclosure in a protective tube; and Fig. 7 is a sectional view taken on line 7—7 of Fig. 6.

In a preferred method of manufacturing a fire detector element in accordance with this invention, a material is used containing at least one ingredient, such as steatite, which will not deteriorate or be removed by heating within the range of temperatures including those to which the detector element is subjected in manufacture or use, and which will be attached (for example, by shrinkage or fusion) to the metal of the conductors by heating, and a second ingredient, such as thorium oxalate, which will shrink when heated to a temperature which may easily be produced in manufacture and at which the first ingredient will become attached to the wires. This material is formed in a continuous cylinder about two spaced electrically conductive wires and is then dried in order to make a generally cohesive, unitary structure. This is then heated to a temperature and for such a time that the shrinkable material is reduced in volume, causing the cylinder of material covering the wires to shrink radially and longitudinally thereof. In shrinking longitudinally the material separates, by cracking approximately normally to the wires, into a plurality of "beads" spaced along the conductors and attached thereto. This unitary assembly of conductors and dis-continuous covering may then be encased in a tightly-fitted tube which protects the parts and holds them permanently and firmly in position.

In the manufacture of a temperature-sensitive resistance device by the method of this invention, a thermistor material is added to the material which is extruded about the wires. A thermistor material which has been found to be entirely satisfactory in imparting the desired temperature-resistance characteristics has the following ingredients:

| | |
|---|---|
| Feldspar | 31.00 |
| Flint | 11.40 |
| Borax | 37.10 |
| Soda ash | 5.90 |
| Soda nitre | 3.80 |
| Fluorspar | 9.00 |
| Cobalt oxide | .50 |
| Nickel oxide | .40 |
| Manganese oxide | .90 |
| | 100.00 |

In practice these listed ingredients are melted, poured into water and then ground to powder in a ball mill. Two or more parts of the powder are then mixed with ten parts by volume of a mixture of an inert ceramic material, such as steatite (60% to 90%), and a material which will be reduced in volume (i. e. shrunk) by heating, such as a colloid, for example thorium oxalate or unburned thorium oxide (40% to 10%). Sufficient of the shrinkable material must be added to the thermistor frit to insure that when it is reduced in volume by heating the shrinkage will be enough to cause the desired separation into beads. The spacing of the beads is controlled by this shrinkage and must be great enough to allow bending of the finished detector cable through a small radius without breaking the wires or crushing the beads, but must also be small enough to prevent contact of the conductors with each other or with the protective casing. It has been found that the specified proportion of these ingredients will produce these results.

The described ingredients are mixed in a ball mill, after which sufficient water is added to make the mixture plastic, and this material is formed in a cylinder about two parallel, spaced electrically conductive wires. This step is preferably performed by extruding the material from a hopper 2 (see Fig. 1) through an orifice 4 through which the conductors 6 are led, thus producing a solid cylinder of the material having the conductors embedded therein. This step may, of course, be performed by casting, molding or other suitable method. This cylinder is led directly from the extruding orifice to a drying furnace 10 the temperature in which may increase from 122° F. at the entrance to a maximum of 230° F. in a typical case. The purpose of this drying step is merely to impart an initial cohesiveness to the extruded material and permit further heating to reduce the volume of the shrinkable material. The product of this drying step is illustrated in Figs. 3 and 4 and comprises a solid cylinder 20 of thermistor material having the conductors 6 embedded therein.

The dried solid cylinder 20, in the form shown in Fig. 3, and preferably in relatively long or continuous lengths, is now baked at a sufficiently high temperature for a sufficient length of time to cause the shrinkable ingredient of the material forming the cylinder to shrink radially and longitudinally of the wires, causing the entire cylinder of covering material to crack, normally to the wires and at closely-spaced points along its length, into beads which are attached to the conductors, by fusion, shrinkage or other action of the ceramic. This step may be performed in any suitable heating device, such as the furnace 30 of Fig. 2, in which a plurality of elements 32 may be baked. In a process using the described materials, the heating is continued for approximately 48 hours at a temperature of approximately 1600° F., although for low ambient temperature operation and a relatively low maximum temperature, both the time and temperature may be reduced. During this heating the extruded material 20 shrinks both radially and longitudinally of the wires, causing it to change from the continuous, cylindrical form shown in Fig. 3 to the form shown in Fig. 5, in which it comprises a dis-continuous covering consisting of a plurality of beads 40 spaced along the conductors 6 and attached thereto and having the same cross-section except for the radial shrinkage as the continuous extruded material of Fig. 3. These beads will be slightly spaced apart, or lightly abutting each other, and will be separated by irregular cracks, as shown in Figs. 5 and 6. Due to the attachment of the thermistor material to the conductors, which is accomplished by the heating steps, these parts are substantially permanently united, forming a unitary structure. The spacing of the beads permits the cable to be bent through a small radius, with the advantageous effects and results described hereinbefore.

After completion of the shrinking step the beads are allowed to cool and the entire assembly of beads and conductors is enclosed in a protective casing 50 which may be made of suitable material, such as the alloys now known as Monel and Inconel, and which is of such small thickness (e. g. a few thousandths of an inch) that it does not prevent bending of the detector.

It will, of course, be apparent that other materials than those described hereinbefore may be used in carrying out the described process without departing in any way from the invention.

In the method of manufacturing a fire detector element which is described hereinbefore, the thermistor material is incorporated in the original material and continues in it throughout the entire method. In another method of manufacturing a fire detector element no thermistor material is included in the original material, but the dis-continuous covering is formed on the wires and is then impregnated with the thermistor material. In this method a mixture of a ceramic and a shrinkable material is extruded onto the wires in the manner described hereinbefore. The solid cylinder so formed is dried and then baked at approximately 1800° F. for about one-half hour to partially fuse the ceramic and shrink the shrinkable materials, thus forming porous beads spaced along the length of the wires. These beads are now impregnated with a solution of a material which is itself a thermistor or which is changed into a thermistor material by a subsequent treatment such as heating. If a material of the former type is used the beads may be dipped in a solution of iodine sulfide, which is itself a thermistor, after which the entire assembly is dried, as by heat, and then forms a thermistor element. If a material of the latter type is used the beads are dipped in a solution of a material such as iron chloride, zinc chloride or sodium dichromate, or other soluble metallic compound which, when heated, changes into an insoluble oxide. The impregnated assembly of beads and wires is then heated, for example at approximately 1600° F. for about 48 hours, to cause the impregnating material to change to oxide form thus imparting the desired thermistor character to the beads and to also cause the "beads" to become attached to the wires.

What is claimed is:

1. The method of manufacturing a device consisting of one or more wires having a discontinuous covering extending along the length thereof and attached thereto, which comprises the steps of covering the wires with a material containing an ingredient which is reduced in volume and changed to a temperature-sensitive resistance material by heating and a second ingredient which becomes coherent and attached to the wires by such heating, and heating the wires and covering material to cause the one ingredient to become coherent and attached to the wires and the other ingredient to be reduced in volume and changed to a temperature-sensitive resistance material whereby the covering shrinks longitudinally of the wires and separates at spaced points along the length thereof to provide a discontinuous covering.

2. The method of manufacturing a device consisting of one or more wires having a discontinuous covering extending along the length thereof and formed of a material the electrical resistance of which changes with change of temperature, which comprises the steps of covering the wires with a material containing an ingredient the electrical resistance of which changes with change in temperature, a second ingredient which becomes coherent and attached to the wires by heating, and a third ingredient which is reduced in volume by such heating, and heating to make the second ingredient coherent and attach it to the wires and to reduce the volume of the third ingredient whereby the covering shrinks longitudinally of the wires and separates at spaced points along the length thereof to provide a discontinuous covering.

3. The method of manufacturing a device consisting of one or more wires having a discontinuous covering extending along the length thereof and formed of a material including an ingredient the electrical resistance of which changes with change of temperature, which comprises the steps of covering the wires with a material containing an ingredient the electrical resistance of which after heating changes with change in temperature, a second ingredient which becomes coherent and attached to the wires by heating, and a third ingredient which is reduced in volume by such heating, and heating to make the second ingredient coherent and attach it to the wires and to reduce the volume of the third ingredient whereby the covering shrinks longitudinally of the wires and separates at spaced points along the length thereof to provide a discontinuous covering.

4. The method of manufacturing a device consisting of one or more wires having a discontinuous covering extending along the length thereof and formed of a material including an ingredient the electrical resistance of which changes with change of temperature, which comprises the steps of covering the wires with a material containing an ingredient which is reduced in volume by heating and a second ingredient which becomes impregnatable and attached to the wires by such heating, and heating the wires and covering material to cause the one ingredient to become attached to the wires and the other ingredient to be reduced in volume whereby the covering shrinks longitudinally of the wires and separates at spaced points along the length thereof to provide a discontinuous covering, impregnating the discontinuous covering with a material which is changed by heat to a material the electrical resistance of which changes with change in temperature, and heating the wires and impregnated discontinuous covering to effect said change.

5. The method of manufacturing a device consisting of one or more wires having a discontinuous covering extending along the length thereof and formed of a material including an ingredient the electrical resistance of which changes with change of temperature, which comprises the steps of covering the wires with a material containing an ingredient which is reduced in volume by heating and a second ingredient which becomes impregnatable and attached to the wires by such heating, and heating the wires and covering material to cause the one ingredient to become attached to the wires and the other ingredient to be reduced in volume whereby the covering shrinks longitudinally of the wires and separates at spaced points along the length thereof to provide a discontinuous covering, and impregnating the discontinuous covering with a material.

6. The method of manufacturing a continuous flexible cable comprising at least one wire and a plurality of beads of insulating material surrounding and attached thereto and spaced along the length thereof, which comprises the steps of forming about the wire a solid continuous cylinder of material containing an ingredient which is attached to the wire by heating and an ingredient which is reduced in volume but not removed by heating, and heating the assembly sufficiently to attach the one ingredient to the wire and reduce the volume of the second ingredient.

7. The method of manufacturing a device which comprises two spaced, parallel, continuous, electrically conductive wires and a discontinuous covering surrounding and attached to the wires, which comprises the steps of forming about two spaced, parallel, continuous, electrically conductive wires a solid, continuous cylinder of material containing at least one ingredient which changes in electrical conductivity with change in temperature, which is not removed by heating within a range within which the element is to be used and which will be attached to the conductors by heating, and at least one ingredient which is reduced in volume but not removed by heating to the temperature required to attach the first ingredient to the conductors, and heating the cylinder of material to attach the one ingredient to the wires and reduce the volume of the second ingredient.

MELVILLE F. PETERS.

REFERENCES CITED

The following references are of record in the file of this patent:

UNITED STATES PATENTS

| Number | Name | Date |
| --- | --- | --- |
| 757,483 | McClenahan | Apr. 19, 1904 |
| 1,765,312 | Steffens | June 17, 1930 |
| 2,149,002 | Wermine | Feb. 28, 1939 |
| 2,495,867 | Peters | Jan. 31, 1950 |